Jan. 2, 1951          M. TAMA          2,536,859
METHOD AND DEVICE FOR PUMPING MOLTEN METALS
Filed May 23, 1946          2 Sheets—Sheet 1
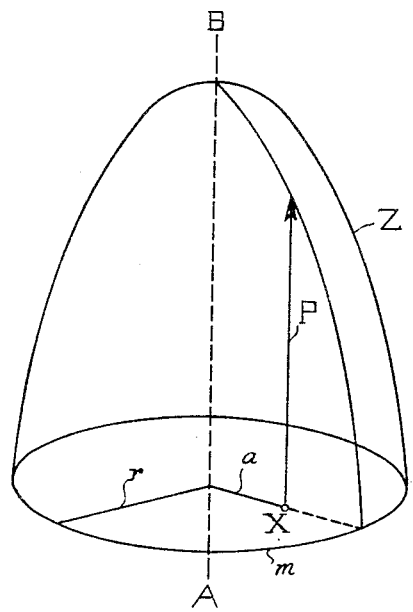
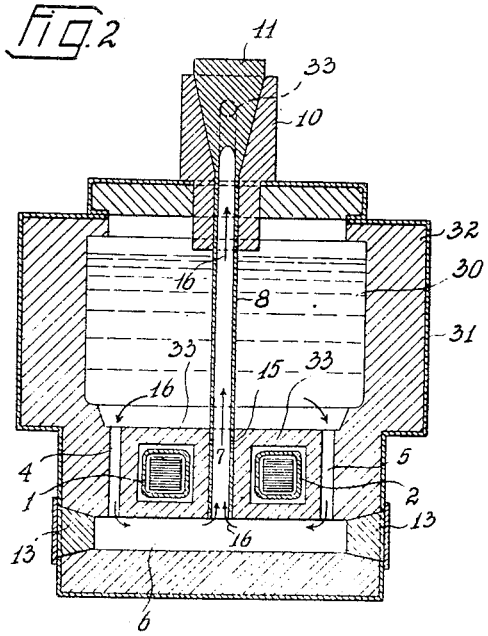
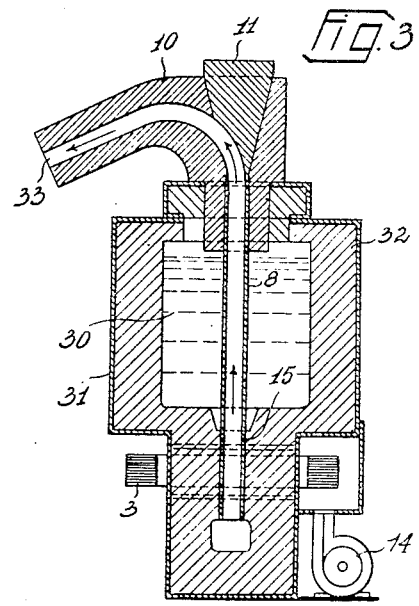
INVENTOR.
MARIO TAMA
BY
ATTORNEY

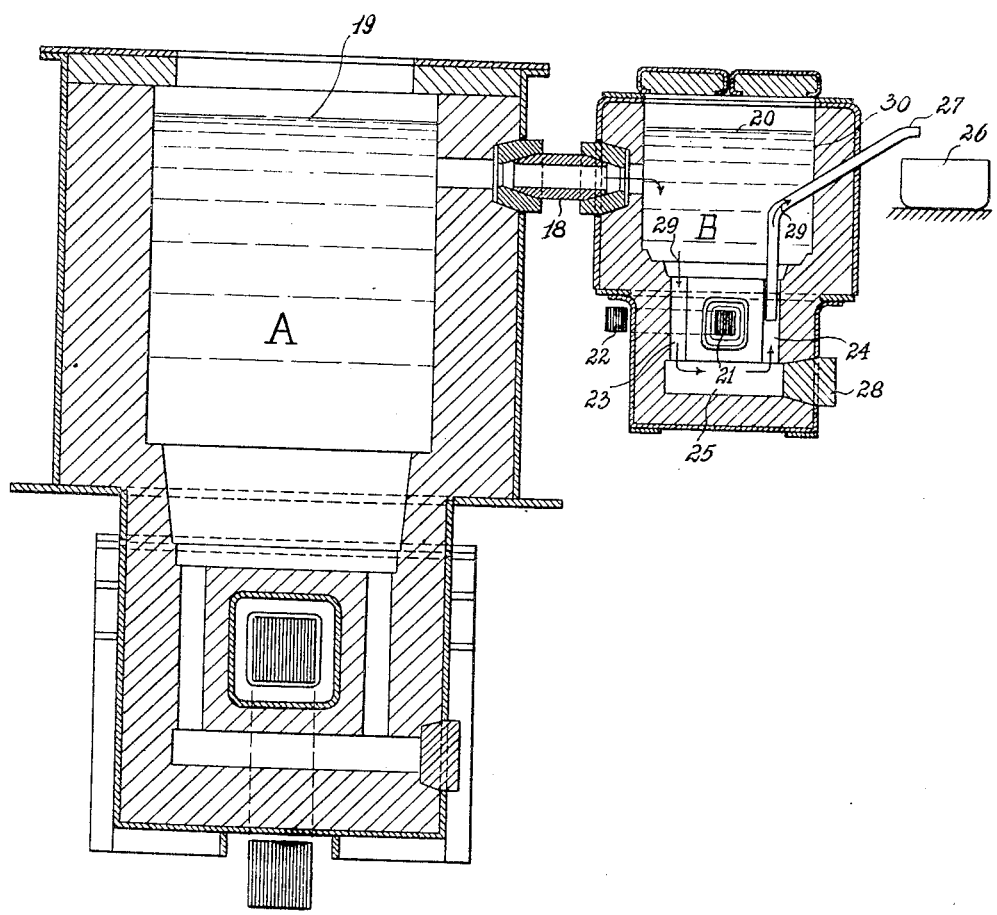

Patented Jan. 2, 1951

2,536,859

UNITED STATES PATENT OFFICE 2,536,859

METHOD AND DEVICE FOR PUMPING MOLTEN METALS

Mario Tama, Morrisville, Pa., assignor to Ajax Engineering Corporation, Trenton, N. J.

Application May 23, 1946, Serial No. 671,818

9 Claims. (Cl. 13—33)

1

This invention relates to an induction furnace of the submerged resistor type and to a method of operating the same, which is similarly disclosed in copending U. S. patent applications Serial No. 647,831, filed Feb. 15, 1946; Ser. No. 683,115, filed July 12, 1946; Ser. No. 735,851, filed Mar. 20, 1947, and Ser. No. 755,886, filed June 20, 1947.

The invention is based on the general idea also inherent in the copending patent applications of creating in a submerged resistor type furnace a unidirectional metal flow from the melting loop into a zone which is essentially free from inductive influence; for this purpose a refractory tube is inserted with its one end into the melting loop; the tube reaches with its other end into a zone which is essentially not influenced by induction.

The above-referred-to copending patent application Serial No. 683,115, filed July 12, 1946, generally claims this inventive idea.

Patent application Ser. No. 647,831, filed Feb. 15, 1946, claims the insertion of a refractory tube into the melting loop of the furnace in such a manner that the end of the tube is spaced from the channel wall and freely reaches into the channel.

Patent application Serial No. 735,851, filed March 20, 1947, claims the creation of a unidirectional closed metal flow through the melting loop and the hearth of the same induction furnace by the connection of a refractory, current conductive tube with the melting loop.

Patent application Serial No. 755,886, filed June 20, 1947, claims the application of the general inventive idea of creating a unidirectional metal flow by insertion of a refractory tube into a melting loop of an induction furnace to a furnace having a plurality of chambers connected by this loop and the creation of the closed metal flow through these chambers and the connecting melting loop.

In claims 5 to 8 and claim 9 of the present application a method is claimed of pumping a molten metal from an induction furnace by inserting a refractory, current-conductive tube into a melting channel, whereas the above referred-to copending patent applications are apparatus inventions.

Claim 1 of this application claims the maintenance of a small clearance between the outside of the inserted tube and the inside of the melting duct; claim 3 of this application claims the insertion of an additional refractory tube into the melting channel and claim 4 the application of the unidirectional flow principle to a duplex induction furnace consisting of a large capacity and a small capacity melting furnace.

The transportation of liquids at low tempera-

2 tures is customarily accomplished with mechanical pumps. Such machines, however, cannot be used for conveying molten metals at high temperatures, because their moving metallic parts, chiefly made of iron or steel, are rapidly worn out. The rapid transfer of molten metals through pipelines by means of pumps, although highly desirable for many production purposes, has been practically limited, therefore, to metals of low melting point or to those which do not readily dissolve iron or steel. Attempts were made to pump molten iron by gas pressure; in this case a gas impregnated metal results which is unusable for most practical purposes.

Therefore the pumping of metal by means of mechanical pumps is at the present practically restricted to mercury, lead, zinc, magnesium and some of their alloys. However, also with these metals the operation is complicated and the life of the pumps is limited.

The present invention is exclusively concerned with the pumping of metals, having a high melting point, such as aluminum, copper, nickel, iron and their alloys, without in any way reducing the efficiency of the pumping device.

Therefore, it is the primary object of the invention to provide an efficient and simple method and apparatus for moving molten metals, having a high melting point through pipelines against the action of gravity purely by the use of electromagnetic forces and without the application of metallic impellers.

The realization of a practically reliable and efficient pumping method for metals having a high melting point and a durable device to achieve this purpose opens a variety of new and useful fields, which are further objects of the present invention, as for instance:

(1) Discharge of the molten metal from a stationary melting furnace, thus eliminating the need for tilting equipment, (2) Stirring the metal contained in a reverberatory furnace, (3) Improving the heat transfer in reverberatory furnaces by pumping the molten metal from colder to hotter zones, (4) Transfer of the molten metal from a container to a second container, the metal being, for instance, kept in both containers at substantially the same level as is the case in two communicating furnace chambers, (5) Syphoning the metals from one container to another, (6) Starting a syphon for the molten metals, (7) Tapping or spigoting the molten metal from a furnace to permanent molds or die casting molds.

Another object of the invention is to control the pumping speed by regulation of the current intensity.

It is also an object of the invention to provide means for an easy starting and stopping of the flow of the molten metal through a pipeline.

Another important object of the invention is the realization of a unidirectional flow of a molten metal from the channel system of a submerged resistor type induction furnace into sections of the bath where normal hydrostatic liquid pressures exist.

The physical laws providing the basis for the instant invention are the following:

When an electric current is forced to pass through a conductor—molten or solid—it creates a magnetic field within the conductor and outside of it. Only the field within the conductor produces forces beneficial for carrying out the invention.

The shape of this magnetic field is substantially the same when direct current or alternating current is used. By the combined effect of the current elements flowing through the conductor and the magnetic field elements cutting through said current elements, internal forces are created within the conductor.

If the conductor is a molten metal, electromagnetic pressure gradients are established within the conductor with zones of high pressure at certain places and zones of low pressure at other places. The forces are directed towards the center of the magnetic field and the direction of the forces can be determined by the well-known three-finger rule. If alternating current is used, the direction of the forces is not changed when the current is reversed. Therefore, the pressure gradients created within the molten metal are always maintained in a definite direction during the entire process.

An evaluation of the forces produced by virtue of the aforementioned principle has been recited in my U. S. Patents 2,375,049 and 2,381,523.

The first physical explanation of the pressures and forces in liquid electric conductors was given by Dr. E. F. Northrup in an article published in "Physical Review," 1907, page 474 and following. These forces have been collectively known as the "pinch effect" and many industrial uses thereof have been suggested in the past. However, no practical utilization of this principle for the pumping of molten metals having a high melting point at elevated temperatures has been made heretofore, in spite of its apparent great advantages.

The distribution of the liquid pressures thus created in the interior of molten conductors is not easy to evaluate in a general way. But a good approximation can be obtained by examining the conditions existing in a long conductor of circular cross section carrying a heavy current with the return conductor at a considerable distance away, in which case the center of the magnetic field coincides with the geometric center of the circle.

The liquid pressures caused by the current flowing through a circular conductor are zero at the periphery and reach the maximum value at the center line; they are, as generally known, propagated in all directions; their distribution is symbolically illustrated in Fig. 1 of the attached drawings, where the liquid pressures for each point within a circle $m$ having a radius $r$ may be entered as vertical arrows on the plane of this circle; it is, however, well understood that this manner of illustration is not intended to indicate that the pressures are all in the same direction. The arrow $P$, for instance, signifies the pressure prevailing at a point $X$ located within the plane of circle $m$ at a distance $a$ from the center.

If all values of the liquid pressures are entered in the same manner, the points of the arrows will lie on the surface of a paraboloid of revolution $Z$. The maximum of pressure $p_{max}$ exists in the center line AB of the paraboloid Z. Its value is:

$$p_{max} = \frac{\pi \cdot j^2 \cdot r^2}{100} \qquad (1)$$

Where $p_{max}$=liquid pressure at center line in dyn./cm.$^3$
$j$=current density in amperes/cm.$^2$
$r$=radius of conductor in cm.

The value of the pressure at any intermediate point X within the plane of circle $m$ located at a radial distance $x$ from the center is $$p = \frac{\pi \cdot j^2 \cdot (r^2 - x^2)}{100} \qquad (2)$$

with the same dimensions as in Equation 1.

In carrying out the present invention, however, it has been found that practical pumping efficiency cannot be obtained if only the maximum pressure is utilized. Larger amounts of metal can be transported if a large part or the entire cross section of the conductor is utilized for pumping.

In order to evaluate the pressures obtainable under such conditions, the average pressure over the entire cross section of circle $m$ must be computed. The same purpose is achieved by determining the height of a cylinder having the same volume and the same radius as the paraboloid Z. By integration it is found that the average pressure $p_{ar}$ is equal to one-half of the maximum pressure:

$$p_{ar} = \frac{p_{max}}{2} = \frac{j^2 r^2}{200} \qquad (3)$$

The values thus deduced from the physical laws check approximately with practical measurements obtained with the instant pumping method, as will be shown thereafter.

In the straight circular channels used in connection with the hereafter described pumping devices the magnetic field is frequently unsymmetric; hence, the center of the magnetic field lines will be located outside of the geometric center of the circle; in these cases the maximum of pressure will be found in an excentric location relative to the center of the magnetic field.

The utilization of electromagnetic forces for the pumping of liquid conductors, such as mercury at room temperature is generally known. However, in these prior art devices, the electromagnetic moving impetus is directly applied to the liquid by magnets or metallic electrodes or conductors and the horizontally extending passageway for the liquid conductor is being recessed from a metal plate. Based on the same principle of direct current connection, tubes have been designed to transport liquid conductors in a horizontal direction at room temperature, the tube walls being provided with slots and the current being passed by metal electrodes through the slots to the fluid conductor.

In all these prior art devices the path of the current is perpendicular to the flow direction of the liquid conductor and specially shaped magnets are provided to serve this end.

The invention signifies a decided departure from the art; it is based on the discovery that the known devices for transporting liquid conductors by means of electromagnetic forces are not usable for the pumping of molten metals having a high melting point such as for instance iron, copper, aluminum, nickel and its alloys and that an entirely different and more effective utilization of the magnetic field had to be found which renders it possible to operate with high pressure differences within the molten metal and not with the natural forces created by the magnetic field in combination with the use of electrodes or magnets.

The invention therefore utilizes the liquid pressures illustrated in Fig. 1 of the drawings, thereby creating a flow direction of the molten metal in the same direction as the current flows which is a principle deviation from the prior art, where the transportation or pumping of the liquid conductor only results from field lines cutting the liquid conductor transversally to its flow direction.

This object can only be realized by the current induction method which renders it possible to concentrate the high current densities necessary for the successful operation of this invention, where currents ranging from about 10,000 to 100,000 amperes and current densities from 500 to 2,000 amperes/cm.$^2$ are used. According to the Equations 1 and 2, the internal pressures increase with the square of the current density; hence, with large current densities appreciable pressures can be obtained, which are of particular importance for transporting heavy metals as for instance, copper alloys.

On the other hand and since the pumped metal mainly originates from the center of the molten metal, the latter is relatively gas-free compared with the balance of the molten bath from where the metal is pumped because of the high liquid pressure exerted at the point of the flow origin.

Although it would be theoretically possible to carry out the present invention by leading the current over heavy graphite electrodes, it is believed that such a device would be too expensive and complicated. Therefore, the induction method is recommended as the most efficient and desirable.

The existence of internal liquid pressure inside of the melting channels of induction furnaces has been always disclosed to the observer of such furnaces by the violent stirring present in the hearths of these furnaces. However, no suggestions have been made to utilize these pressures for the pumping of molten metals at elevated temperatures. A principle difference also exists insofar over the known method of circulating the molten metal through the secondary channel system of coreless induction furnaces where the metal flow remains within a zone of the bath which is under the influence of the electromagnetic forces and the metal is not lifted from the zone of superimposed pressure into a zone of the bath which is free from this pressure increase.

In carrying out the present invention a tube is used for conveying the molten metal from one place to another. This tube should be a good conductor of electricity and should withstand the attack of the molten metal.

Tubes made of ordinary refractory materials, such as fireclay, are known for the transport of molten iron; however, they would obviously not serve the purposes of this invention.

Graphite is one of the best materials recommended for the tubes because of its high resistance to the molten metals, good electric conductivity and good thermal conductivity. Of all the commercial metals iron and steel were the only ones which would attack or dissolve graphite; therefore, silicon carbide is a second choice as material for the hot metal pipelines.

As explained above, when a current travels through a molten conductor, an additional liquid pressure is created, such pressure being superimposed on the hydrostatic pressure existing at each particular point. Therefore, if a pipe is located with its one end at the point of superimposed liquid pressure and with its other end in the molten metal bath where no pressure is superimposed by a flowing electric current, the metal will flow within the tube from the first to the second place. If the current is disconnected, no pumping action will occur. Therefore, an efficient pumping action can only be obtained if a place of superimposed electromagnetic pressure is connected by the tube with another place in which said superimposed electromagnetic pressure does not exist or is negligibly small.

From the above it is apparent that the submerged resistor type induction furnace is particularly well suited for the realization of the above recited principles upon which this invention is based, because the melting channels of these furnaces are the natural source for the creation of places of superimposed high electromagnetic pressure.

In the past many attempts have been made to simplify the discharge of the hot molten metal from submerged resistor type induction furnaces; in spite of these furnaces being known and used about thirty-five years for melting metals the hitherto considered simplest discharging method is the tilting of the furnace; to tilt a furnace filled with molten metal requires an intricate and costly machinery; moreover, it causes interruption of the furnace operation. These difficulties actually represent a major impediment for the general introduction of the otherwise highly progressive submerged resistor type induction furnace. In spite of the extreme urgency to find means for an easy discharge of the molten metal from these furnaces the principle of superimposing an electromagnetic pressure upon the hydrostatic pressure in a lower section of the metal bath and discharging the metal by the thus created increase from the furnace has never been suggested.

This superimposed pressure is always found at the places where an electric current is concentrated. Therefore, in places of the metal bath where the electric current is absent, there will be no superimposed pressure. In an electric furnace of the submerged resistor type, for instance, current concentration is, as stated above, found chiefly inside of the melting channels, but also at the bottom of the hearth at the grooves connecting the openings of the melting channels into the hearth. In all these places there will be a concentration of current and a higher electromagnetically produced liquid pressure. It would be useless to connect by a pipe, for instance, one place lying inside of the melting channels with another place lying in the path of the current flowing from the mouth of one melting channel to the other. Zones of superimposed pressure are equivalent to zones carrying a concentration of current.

A concentration of current can be economically produced by any kind of induction heated apparatus, such as submerged resistor, open ring or coreless type induction furnaces. Of all these three types, however, the first one is, as stated above, the most adaptable for obtaining high concentrations of current and high pumping efficiency. In a submerged resistor type furnace the molten metal is held in a refractory lined hearth, which is connected with a refractory lined duct system, the latter surrounding one or more transformer assemblies. In a device of this kind a high concentration of current is created by electromagnetic induction in the duct system which forms the secondary loop of the transformer.

In carrying out the invention a high pumping efficiency can be obtained by holding the metal in a submerged resistor induction furnace, energizing said furnace by the usual methods and interrupting the metallic contact of the secondary circuit by interposing a refractory tube of good electric conductivity into the current path. By following these steps the molten metal will be carried through the inside of the tube to a higher level outside of the tube. This pumping action can be obtained as a continuous fountain. The pumping tube interrupts the secondary circuit in such a manner that heating current has to pass through the walls of the tube. Therefore, it is necessary that the tube should resist the action of the current and that it should be of high electrical and thermal conductivity. Inadequate materials, such as ordinary refractories, fireclay and the like would either be dissolved in the melt or overheated. It has been found that graphite tubes respond very well to these requirements.

The invention is by way of example illustrated in the accompanying drawings; in the drawing the already mentioned Fig. 1 symbolizes the direction of the liquid pressure relied upon in the performance of the invention, Fig. 2 is a vertical sectional elevation of a twin coil submerged resistor type induction furnace for carrying out the invention, Fig. 3 is a vertical sectional elevation on line 3 to 3 of Fig. 1, Fig. 4 is a vertical sectional elevation of a duplex furnace of the submerged resistor type, the larger furnace being the melting furnace connected with a smaller pouring furnace, the latter being equipped with a pumping device in accordance with the invention.

For the illustration of the embodiment of the invention shown in Figures 2 and 3 a furnace very similar to the twin coil induction furnace described in my U. S. patent, Reissue No. 22,602 is used. The furnace consists of a container or hearth 30 for the molten metal which is surrounded by an outer casing 31 and is lined with a suitable refractory material 32. The secondary blocks 33, also surrounded by casing 31, are located underneath the hearth 30.

A transformer assembly consisting of the primary coils 1 and 2, together with the laminated core 3 is provided in the customary manner to induce heavy alternating currents in the secondary duct or circuit system formed by the lateral vertical channels 4 and 5, the horizontal channel 6 and the center channel 7.

The furnace is charged with molten metal and the first step of the instant method consists in causing by electromagnetic induction heavy currents to flow through the refractory lined duct 4, 5, 6, 7 which contains molten metal and surrounds the transformer assembly 1, 2, 3. A pumping tube 8 made of a molten metal resistant material of good electrical conductivity, for instance, graphite or silicon carbide is inserted into center channel 7 thereby discontinuing the flow of metal from the upper end of the channel into the hearth 30. The tube 8 is placed with relation to channel 7 in such a manner that it forms a direct prolongation thereof without a substantial change of the cross section or of the direction between the tube and channel. Furthermore, the tube 8 interrupts the metallic contact of the loop forming the secondary of the transformer circuit. The entire electric current induced in the secondary is, therefore, forced to pass through the walls of tube 8 from the metal inside to the metal outside thereof.

In carrying-out the invention a heavy current is generated by induction within the secondary loop; due to the thus superimposed liquid pressure created in the section of the metal bath contained in channel 7 and in the lower portion of pumping tube 8 the metal rises in the direction of arrows 16 from the central channel 7 or the lower portion of the pumping tube 8. Accordingly metal will flow from the hearth 30 in the direction of the arrows into the upper end of channels 4, 5 to be replenished as it is discharged by a suitable charging device, not shown in the drawing. Following further the travel of the metal upward, the current is deflected at the transition point from the central channel 7 into the upper section of the pumping tube 8 at right angles to the right and left of Fig. 2. Following the travel of the molten metal within tube 8 towards the top of the pumping device, zones or sections are reached of the metal bath held in container 30 where no electric current flows, in other words, those sections of the bath which according to the theory developed above have no superimposed liquid pressure. It is at these places that the pumping action comes into effect, the molten metal being expelled from the zone or section of superimposed high liquid pressure within the central channel 7 into a zone or section of the bath where such superimposed pressure is absent, that is in the upper part of the pumping tube 8. The magnitude of this pumping action can be regulated by proper dimensioning of the central channel 7 with relation to the current induced therein.

The device shown in Figs. 2 and 3 further contains a removable plug 11 and a pouring spout 10, both made of ordinary refractory material. The metal being ejected from the central channel 7 into and through the pumping tube 8 is gradually deviated into the horizontal direction by means of the curved duct 33 inside of pouring spout 10. Removable plug 11 serves to inspect the inside of pumping tube 8 and to clean it whenever necessary. A cover is provided to seal the pumping device and to protect the refractory lining 32 of the furnace walls.

Removable plugs 13 provide easy access to the horizontal channel 6. A blower 14 serves to keep the primary coils 1 and 2 cool. The pumping tube 8 is separated at 15, this separation being located substantially at the upper end of channel 7, therefore the whole assembly containing the upper portion of tube 8, plug 11 and spout plug 10 can be easily separated from the other parts of the pumping device. It is obvious from the above that the tube 8 need not reach downwardly through the length of channel 7 and could end short of the lower end of the same.

At the rate that new molten metal is fed into the furnace, the same can be continuously pumped from a lower to a higher level and discharged from the furnace in the above described manner.

This pumping method has been practically carried out in a furnace as shown in the drawings where the center duct had a cross section of 50 cm.$^2$; a current of 30,000 amps. was forced through this duct. The tube 8 had a cross section of 10 cm.$^2$ and the bath consisting of a molten aluminum alloy was forced out of the pumping device into the molds at a rate of 150 kg./min, overcoming an average difference of level of 15 cm. The flow could be maintained, although at a slower rate, even if the difference of level was increased to 32 cm. With a tube having a cross section of 3 cm.$^2$ a flow rate of 40 kg./min. was obtained under similar conditions.

By contracting the cross section of the channel a pumping head in excess of 90 centimeters was obtained in a pipe with 2.5 centimeters' diameter, with a very much reduced flow of metal. Using the same size of pipe for discharge of molten metal over the top of the pumping unit into an ingot mold, a flow of metal varying from 60 to 90 kgs./min. was obtained when working against a head of 60 centimeters.

A further embodiment of the invention is shown in Fig. 4; it illustrates a method of pouring metal from a furnace provided with a pumping device according to the invention into foundry molds. This procedure is of particular importance in connection with permanent mold casting and it is for this type of work that this embodiment of the invention is particularly useful.

A larger melting furnace A and a smaller furnace B including a pumping device are combined to form a duplex aggregate. The induction melting furnace A of large capacity is used to do the bulk of the melting operation. Aluminum alloy ingots are charged into this furnace continuously by means not shown in the drawing; the molten metal is transferred through a refractory pipe 18 into hearth 30 of furnace B. The metal levels 19 and 20 in the melting and in the pumping unit are maintained approximately at the same height by charging the melting furnace continuously with as much metal as is poured into the molds 26. The temperature in the melting furnace is automatically controlled in the customary manner in order to take care of fluctuations in the speed of charging which may otherwise cause deviations from the casting temperature proper.

The pumping device B consists of an induction apparatus having a primary coil 21 and a laminated core 22, coupled in the manner customary for the submerged resistor type equipment with a secondary circuit formed by the vertical legs 23 and 24 and the bottom channel 25. When current is introduced into the primary coil 21 currents of high magnitude are induced into the secondary circuit. A plug 28 is provided in the usual manner to allow the bottom channels to be cleaned from time to time. A bent tube 27 of a material as previously described is inserted with its one end into channel 24 with the upper end protruding outside of furnace B, leading the metal into the mold 26. When the primary coil is energized, molten metal will flow from the melting furnace through the pumping device into the mold following the path shown by the arrows 29.

In operating this equipment a high liquid pressure is produced by virtue of the physical laws explained above within the ducts 23, 24 and 25. The pressure created within duct 24 is utilized for pumping the metal from the furnace by means of tube 27 inserted into the duct.

In contradistinction to the first embodiment of the invention, the tube 27 is of slightly smaller diameter than the duct 24; therefore the average liquid pressure will be slightly larger than indicated in Equation 3. The main advantage of leaving a small clearance between the outer diameter of tube 27 and the inner wall of duct 24 is to provide an exit for a small quantity of molten metal from duct 24 into the hearth of the furnace. This is important in cases of intermittent operation as the present one, because it is recommendable to keep a small amount of current flowing through the primary and the secondary circuit, which will be just enough to cover the radiation losses of the pumping equipment and to prevent the metal from freezing in the pumping equipment B. The necessary amount of power should be applied at all times to primary coil 21 and the current necessary for pumping the metal through tube 27 is superimposed on this holding power. While the equipment is running under holding power, as described above, a certain circulation is provided for the molten metal emerging from duct 24 into the hearth. If tube 27 seals duct 24 completely heat might stagnate in duct 24 and unduly raise the temperature of the molten metal contained in tube 27. Tube 27 could be made of specific materials, such as for instance fused alumina because the metallic contact of the secondary is not completely interrupted as in the embodiment of the invention illustrated in Figs. 2 and 3.

In carrying out the invention the level of the metal in tube 27 may be raised at will by applying increased voltages to primary coil 21. As recommended above, a basic load sufficient to cover the radiation losses of the pumping unit B should all the time be applied to primary coil 21. The superimposed voltage, necessary to pump the metal through tube 27 and cause it to flow into the molds 26 should be finely regulated in the known manner by means of a regulating transformer or of a motor generator set with controlled excitation. By closely controlling the pumping current it is possible to discharge intermittently small amounts of metal through tube 27 into the molds.

The further important advantage arises from the use of the invention that the metal is discharged from the bottom of the furnace so that any possibility of pouring slag or scum into the molds is eliminated.

I claim:

1. A submerged resistor type induction furnace comprising an upper hearth, a secondary duct system located underneath said hearth, said system being composed of a substantially horizontal bottom duct, a center and two lateral substantially vertical ducts connecting the hearth and said bottom channel, a primary current inducing transformer assembly surrounding said ducts, a tube consisting of an electrically conductive refractory material inserted with its one end in said center channel in such a manner as to leave a small clearance between the outside of said tube and the inside of said duct, the other end of said tube being placed outside of said hearth and above the upper end of said center duct.

2. An induction furnace of the submerged resistor type comprising an upper hearth, a secondary duct system located underneath said hearth, a primary current inducing transformer assembly surrounding said ducts, a first tube of a refractory electrically conductive material inserted with its one end into the upper end of a duct of said duct system, an additional tube located in the residual portion of said duct, forming an extension of said first tube, the other end of said first tube being located outside of said hearth and above the upper end of said duct.

3. An induction furnace of the submerged resistor type comprising an upper hearth, a secondary duct system located underneath said hearth, a primary current inducing transformer assembly surrounding said ducts, and associated therewith to induce a secondary current therethrough, a first tube of an electrically conductive refractory material inserted with its one end into the upper end of a duct of said duct system, an additional refractory tube located in the residual portion of said duct, forming an extension of said first tube, the other end of said first tube leading out of said hearth, a pouring spout connected to said tube end, an opening in said spout and a removable closing plug in said spout opening.

4. A duplex induction furnace of the submerged resistor type comprising a large capacity melting furnace and a smaller capacity pouring furnace, an upper hearth and a secondary duct system located underneath said hearth in each of said furnaces, a primary current inducing transformer assembly surrounding the ducts of said duct system and associated therewith to induce a secondary current therethrough a refractory tube connecting the two hearths, an electrically conductive refractory tube inserted with its one end into a duct of the secondary duct system of said pouring furnace, the other end of said tube being located outside of the hearth of said pouring furnace and above the upper end of said duct.

5. A method of pumping metal comprising holding the metal in the hearth and in the secondary channel system of a submerged resistor type induction furnace in the molten state, passing current through said secondary channel system and creating a secondary circuit, interrupting the metallic contact of said secondary circuit thereafter by inserting into the same a refractory current conductive tube in such a manner that the one end of the tube reaches into a lower level of the molten bath and its other end into a level higher than the surface level of said molten bath, conveying the molten metal through said tube from said lower level to said higher level and creating a continuous one directional flow of the molten metal into the said secondary channel system and from there into said tube.

6. A method of pumping a metal comprising holding the metal in the hearth and in the secondary channel system of a submerged resistor type induction furnace in the molten state, passing current through said secondary channel system and creating a secondary circuit, interrupting the metallic contact of said secondary circuit by thereafter inserting into the same a refractory and current conductive tube in such a manner that the one end of the tube reaches into a lower level and its other end into a place above the level of the molten bath, conveying the molten metal through said tube from said lower level to said place above the level of the molten bath and creating a continuous one directional flow of the molten metal from the hearth into the said secondary channel system and from there into said tube.

7. A method of pumping a metal comprising holding the metal in the hearth and in the secondary channel system of a submerged resistor type induction furnace in the molten state, passing current through said secondary channel system and creating a secondary circuit, interrupting the metallic contact of said secondary circuit by thereafter inserting into the same a refractory and current conductive tube in such a manner that the one end of the tube reaches into a lower level and its other end into a place located outside of said hearth, conveying the molten metal through said tube to said place outside of said hearth and creating a continuous onedirectional flow of the molten metal from the hearth into the said secondary channel system and from there into said tube.

8. A method of pumping a metal comprising holding the metal in the hearth and in the secondary three channel system of a submerged resistor type induction furnace composed of a center and two lateral channels in the molten state, passing current through said secondary channel system and creating a secondary circuit, interrupting the metallic contact of said secondary circuit by thereafter inserting into the center channel a refractory and current conductive tube in such a manner that the one end of the tube reaches into said center channel and its other end to a point above the level of the molten bath, conveying the molten metal through said tube from said center channel to said point above the level of the molten bath and creating a continuous onedirectional flow of the molten metal from the hearth into said lateral channels, from there into said center channel and into said tube.

9. A method of pumping metal comprising holding the metal in a molten state in the hearth and in the secondary duct system of a submerged resistor type induction furnace, passing current through said secondary system and creating a secondary circuit, interrupting the metallic contact of said secondary circuit by thereafter inserting into the same an electrically conductive refractory tube in such a manner that the one end of the tube reaches into a lower level and the other end into a level higher than the surface level of the molten bath, conveying the metal through said tube from said lower level to said higher level, and creating a continuous onedirectional flow of the molten metal through the hearth into the said secondary channel and from there into said tube.

MARIO TAMA.

REFERENCES CITED

The following references are of record in the file of this patent:

UNITED STATES PATENTS

| Number | Name | Date |
|---|---|---|
| 1,660,407 | Bainbridge | Feb. 28, 1928 |
| 1,792,449 | Spencer | Feb. 10, 1931 |
| 1,944,855 | Wadman | Jan. 23, 1934 |
| 2,339,964 | Tama | Jan. 25, 1944 |
| 2,375,049 | Tama | May 1, 1945 |
| 2,381,523 | Tama et al. | Aug. 7, 1945 |
| 2,386,369 | Thompson | Oct. 9, 1945 |
| 2,397,785 | Friedlander | Apr. 2, 1946 |

FOREIGN PATENTS

| Number | Country | Date |
|---|---|---|
| 126,947 | Great Britain | Dec. 24, 1919 |
| 142,110 | Great Britain | Apr. 20, 1920 |